US008964995B2

(12) United States Patent
Cohn et al.

(10) Patent No.: US 8,964,995 B2
(45) Date of Patent: Feb. 24, 2015

(54) ACOUSTIC DIAGNOSIS AND CORRECTION SYSTEM

(75) Inventors: John M. Cohn, Richmond, VT (US); James R. Kozloski, New Fairfield, CT (US); Clifford A. Pickover, Yorktown Heights, NY (US); Jinjun Xiong, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 13/607,033

(22) Filed: Sep. 7, 2012

(65) Prior Publication Data

US 2014/0072125 A1 Mar. 13, 2014

(51) Int. Cl.

*H04R 29/00* (2006.01)
*G06F 11/30* (2006.01)
*G21C 17/00* (2006.01)

(52) U.S. Cl.

USPC .......... 381/56; 702/183

(58) Field of Classification Search

None

See application file for complete search history.

(56) References Cited

U.S. PATENT DOCUMENTS 5,435,185 A 7/1995 Eagan
6,766,692 B1 7/2004 Eagan
7,181,370 B2 2/2007 Furem et al.
2009/0132859 A1 5/2009 Pelley et al.
2009/0326870 A1 12/2009 Brusniak
2010/0318324 A1 12/2010 Kim et al.
2011/0012720 A1 1/2011 Hirschfeld
2011/0209214 A1 * 8/2011 Simske et al. .................. 726/21

OTHER PUBLICATIONS

H. Zhao et al., "Unstable Engine Vibration Signal Analysis using Cyclostationarity and Support Vector Machine Theory", 2nd IEEE International Conference on Computer Science and Information Technology, 2009, ICCSIT. Aug. 8-11, 2009, pp. 434-438.

W. Wang et al., Remote Machine Maintenance System Through Internet and Mobile Communication, Int J. Adv. Manuf. Technol., vol. 31, 2007, pp. 783-789.

W. K. Jiang et al., Research on Diagnosing the Gearbox Faults Based on Near Field Acoustic Holography, Journal of Physics, Conference Series, vol. 305, 2011, 012025, 8 pages.

* cited by examiner

*Primary Examiner* — Regina N Holder

(74) *Attorney, Agent, or Firm* — Cantor Colburn LLP; Vazken Alexanian

(57) ABSTRACT

An acoustic monitoring system includes a portable acoustic detection device, a sound analysis device and a confidence level device. The portable acoustic detection device is capable of receiving sound at one or more locations near a sound-producing device. The sound analysis device receives the sound from the portable sound detection device, determines a diagnosis based on a comparison between the sound and pre-recorded sound data, and outputs the diagnosis to the portable acoustic detection device. The sound analysis device also determines a corrective action for inhibiting the sound, which is also output to the portable sound detection device. The confidence level device determines a confidence level of the diagnosis indicating a likelihood that the diagnosis is successfully diagnosed.

14 Claims, 8 Drawing Sheets

ACOUSTIC DIAGNOSIS AND CORRECTION SYSTEM

BACKGROUND

The present teachings generally relate to an acoustic monitoring system, and more specifically, to diagnosing noise of a sound-producing device.

Traditional sound diagnostic systems utilize sensors fixed to devices or machines to capture sound, and rely on complex computer systems to perform signal analysis of the captured sound. These complex computer systems are typically reserved for expert technicians or employees of the servicing company performing the diagnosis. Consequently, users are unable to personally diagnose unfamiliar or undesirable sounds produced from a device or machine. Moreover, users must typically contact a service technician to obtain a diagnosis of an unfamiliar or undesired sound, which is inconvenient, time consuming and costly.

SUMMARY

According to an exemplary embodiment of the present teachings, an acoustic monitoring system comprises a portable acoustic detection device to receive sound from a sound-producing device, and a sound analysis device in electrical communication with the portable acoustic detection device via a data network. The sound analysis devices determines at least one diagnosis of the sound-producing device based on a comparison between the sound and pre-recorded sound data, and determines at least one corrective action based on the at least one diagnosis. The acoustic monitoring system further includes confidence level device in electrical communication with the portable acoustic detection device and the sound analysis device to determine a confidence level of the at least one diagnosis indicating a likelihood that the at least one diagnosis is successfully diagnosed.

According to another exemplary embodiment of the present teachings, a portable acoustic detection device comprises a sensor to receive sound from a sound-producing device, a wireless communication module to electrically communicate with a sound database that stores pre-stored sound data and to transmit identification data that identifies the sound-producing device. The portable acoustic detection device further includes a sound application module that outputs locality information that indicates a least one location at which the portable acoustic detection device is positioned to receive the sound, and that outputs a diagnosis and corrective action information to inhibit the sound based on a comparison between the sound and the pre-stored sound data.

According to yet another exemplary embodiment of the present teachings, an acoustic analysis device comprises a wireless communication module that electrically communicates with a portable acoustic detection device via a data network to receive sound data that is based on sound produced by a sound-producing device, and a sound database that stores pre-stored sound data, diagnosis data corresponding to the pre-stored sound data, and corrective action data corresponding to the diagnosis data. The acoustic analysis device further includes a diagnosis module that determines at least one diagnosis of the sound-producing device based on a comparison between the sound data and the pre-recorded sound data, and that determines at least one corrective action based on the at least one diagnosis.

Additional features and utility are realized through the techniques of the present teachings. Other embodiments and features of the teachings are described in detail herein and are considered a part of the claimed teachings. For a better understanding of the teachings with the utility and the features, refer to the description and to the drawings.

BRIEF DESCRIPTION OF THE SEVERAL VIEWS OF THE DRAWINGS

The subject matter which is regarded as the teachings is particularly pointed out and distinctly claimed in the claims at the conclusion of the specification. The forgoing and other features, and utility of the teachings are apparent from the following detailed description taken in conjunction with the accompanying drawings in which:

DETAILED DESCRIPTION

The terminology used herein is for the purpose of describing exemplary embodiments only and is not intended to be limiting of the teachings. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

Figure 1:
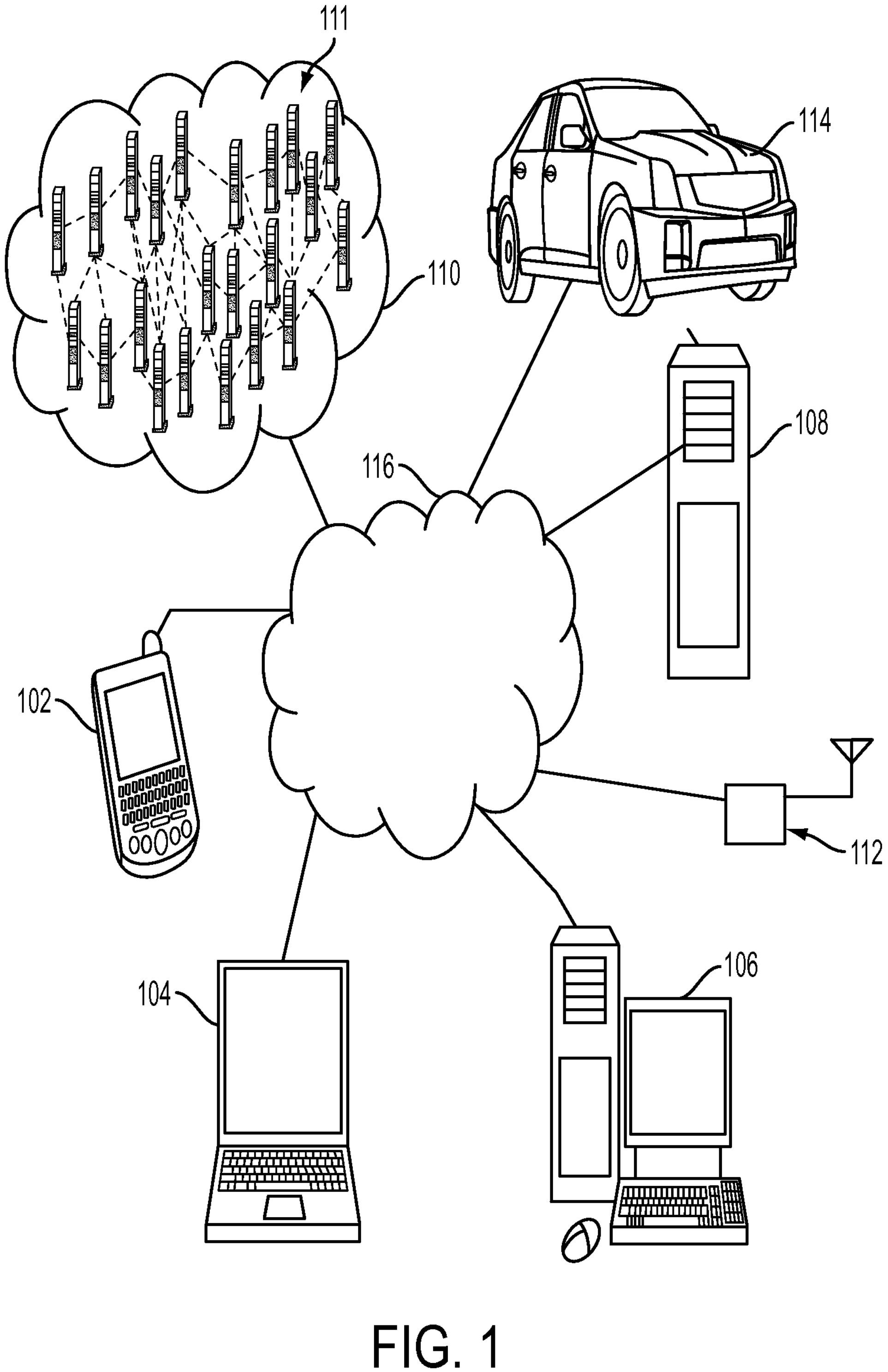
FIG. 1 illustrates an acoustic monitoring communications network according to an exemplary embodiment of the present teachings.

FIG. 1 illustrates an exemplary acoustic monitoring communications network 100 according to an exemplary embodiment of the present teachings. The acoustic monitoring communications network 100 allows communication between various electrical devices and machines. The devices and machines of the acoustic monitoring communications network 100 may include, but are not limited to, a portable acoustic detection device 102, a laptop 104, a desktop work station 106, a data server 108, a cloud computing environment 110, and a sensor-transceiver combination device 112. The acoustic monitoring communications network 100 may also include an automobile 114 equipped with an electronic communication system.

The acoustic monitoring communications network 100 includes a data network 116 to allow each device and/or machine 102-114 to electronically communicate data between one another. The data network 116 may include a wired and/or wireless data communication network. Wireless communication between the electronic devices and machines 102-114 over the data network 116 may be performed according to various well known forms of networking technologies including, but not limited to, WI-FI, Wireless USB, cellular, Bluetooth, optical wireless, radio frequency (RF), etc., and may be used alone or in combination with another to provide the wired and/or wireless connectivity among the electronic devices and machines 102-114.

The portable acoustic detection device 102 may be a hand-held device including, but not limited to, a portable terminal, a cellular telephone, tablet computer, a personal digital assistant (PDA), etc. The portable acoustic detection device 102 may receive, detect and/or capture a sound produced from a sound-producing device, as described in greater detail below.

The cloud computing environment 110 may include one or more cloud computing nodes 111, which may communicate with the various electronic device and machines 102-114. Cloud computing node 111 may also communicate with other cloud computing nodes. They may be grouped (not shown) physically or virtually in one or more networks, such as Private, Community, Public, or Hybrid clouds, as described hereinabove, or a combination thereof. This allows the cloud computing environment 110 to offer infrastructure, platforms, and/or software as services for which a cloud consumer does not need to maintain resources on a local computing device. It is understood that the types of electronic devices and machines described herein are intended to be illustrative only and that the one or more computing nodes 111 and cloud computing environment 110 may communicate with any type of computerized device and machine over any type of network and/or network addressable connection (e.g., using a web browser). Program code located on one of cloud computing nodes 111 may be stored on a computer recordable storage medium in one of cloud computing nodes 111 and downloaded to a computing device within the computing devices and machines over the data network 116 for use in these computing devices. For example, a server computer in cloud computing nodes 111 may store program code on a computer readable storage medium on the server computer. The server computer may download the program code to a client computer at the computing devices and machines in electrical communication with the data network 116 for use on the client computer.

The sensor-transceiver combination device 112 includes a sensor in electrical communication with a transceiver. The sensor may include, for example, a microphone that receives sound. Accordingly, data, such as sound, may be transmitted to a remote device via the transceiver. Moreover, the sensor-transceiver combination device 112 may be implemented in various host devices, as discussed in greater detail below.

Figure 2:
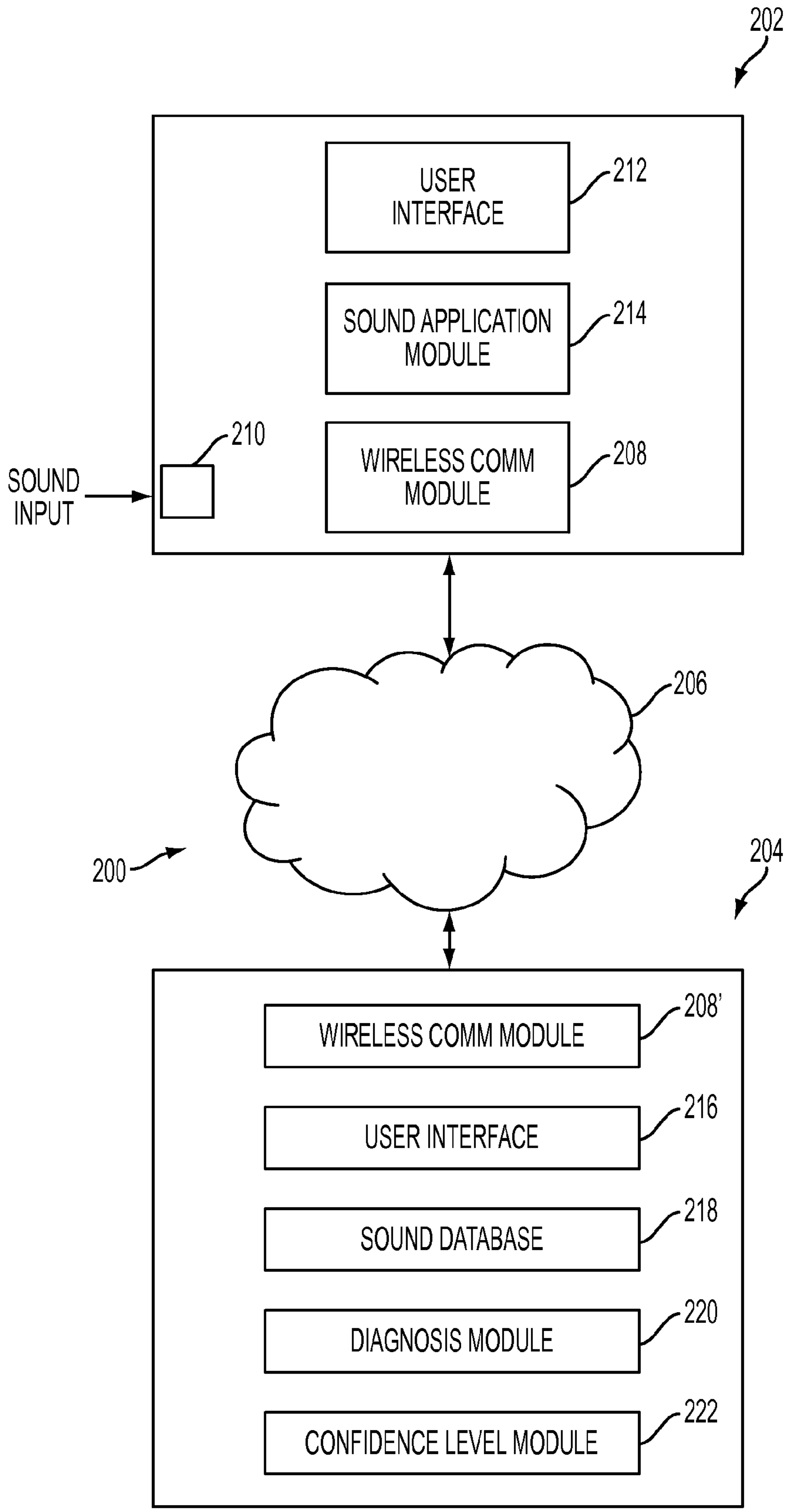
FIG. 2 illustrates an acoustic monitoring system according to an exemplary embodiment of the present teachings.

Referring now to FIG. 2, an exemplary embodiment of an acoustic monitoring system 200 of the present teachings is illustrated. The acoustic monitoring system 200 includes a portable acoustic detection device 202, and a sound analysis device 204. The portable acoustic detection device 202 and the sound analysis device 204 may electrically communicate with one another over a data network 206 via wired and/or wireless communication, as discussed above. For example, the portable acoustic detection device 202 and the sound analysis device 204 may each include a wireless communication module 208/208' that communicates with the data network 206 such that the portable acoustic detection device 202 and the sound analysis device 204 may communicate data between one another.

The portable acoustic detection device 202 includes a sensor 210, such as a microphone, to input sound produced from a sound-producing device. Further, the sound-producing device includes, but is not limited to, a consumer appliance, an automobile, a spinning hard-drive, sounds of a human anatomy, etc. Since at least one exemplary embodiment provides the sensor 210 in the portable acoustic detection device 202 (i.e., the sensor 210 is not necessarily fixed to the sound-producing device), the sensor 210 may be located at a plurality of locations near the sound-producing device. Accordingly, a plurality of sound readings at a plurality of different locations with respect to the sound-producing device may be obtained, as discussed in greater detail below.

The portable acoustic detection device 202 further includes a user interface 212 and a sound application module 214. The user interface 212 may include an input module and/or a display module. The input module may receive at least one input from a user of the portable acoustic detection device 202. For example, the at least one input may include sound-producing device identification information such as a make/model of the sound-producing device, a bar code associated with the sound-producing device, a VIN number, a Quick Response (QR) code, a RFID tag, an input image, and an ID output from the sound-producing device to the portable acoustic detection device. The input may also include location information indicating a location of the sound with respect to the sound-producing device. Additionally, a sound-producing device may transmit the input information to the portable acoustic detection device 202 without user intervention. For example, a sound-producing device may transmit a make/model number to the portable acoustic detection device 202 via Bluetooth, RF, etc.

A display module included with the user interface 212 may display information to a user regarding the diagnosis of a sound-producing device. For example, if the sound-producing device is diagnosed to be faulty, the display module may display an alert to the user. The alert may include, but is not limited to, a graphic, a vibration, and a short message service (SMS) message. The alert may also include an alarm sound output by the user interface.

Additionally, the display unit of the user interface 212 may display sound-producing device information, user control information, diagnosis information, and a corrective action.

The sound-producing device information may include information identifying the sound-producing device. For example, the user interface 212 may display a model name, a model serial number, an image of the sound producing-device, and an image of the sound-producing device and/or a part thereof. Accordingly, a user may be sure the diagnosis provided by the sound monitoring system 200 corresponds to the appropriate sound-producing device.

The user control information may include instructions for obtaining sound samples to be analyzed. For example, the control information may display instructions for locating the portable acoustic detection device 202 at one or more areas surrounding the sound-producing device. In addition, the user control information may include instructions indicating a number of sound samples to obtain, and a period of time over which a sound sample is obtained, and operating instructions for operating the sound-producing device. For example, the operating instructions may instruct a user to adjust an operating speed of the sound-producing device.

The diagnosis information may include downloadable pre-recordings of similar sounds associated with the sound, expert technician diagnosis comments, possible origins of the sound, possible defects of the sound-producing device, and diagnostic codes. The exemplary embodiments described herein are not limited to diagnosing problems, defects, etc. of the sound-producing device. The diagnosis information may also validate proper operation of the sound-producing device.

The corrective action includes information that may assist in inhibiting the sound produced by the sound-producing device. For example, the corrective action may include maintenance instructions and/or sound-producing device settings instructions. The maintenance instructions may provide a user with information for correcting improper operation of the sound-producing device, lists of repair technicians familiar with the improper operation, directions to particular repair shops, repair order forms, service organizations, replacement parts of the sound-producing device, and new sound-producing device sales.

The sound-producing device settings information includes information instructing a user to adjust at least one input setting of the sound-producing device. For example, the sound-producing device setting information may instruct a user to adjust an operating speed, cycling time, power consumption, etc. of the sound-producing device. Hence, if an excessive operating speed is causing a device to produce an undesired sound, the sound producing device setting information may instruct a user to reduce the operating speed of the device, thereby inhibiting the sound.

Referring further to the portable acoustic detection device 202, the sound application module 214 may comprise a processing circuit and a computer program product. The computer program product may include a tangible storage medium readable by the processing circuit. Further, the computer program product may store instructions executable by the processing circuit to process the sound received by the portable acoustic detection device 202. The sound process executed by the processing circuit may include, but is not limited to, obtaining, storing, and accumulating information related to the sound-producing device. The sound processing executed by the processing circuit may also include various signal processing techniques to identify the sound including, but not limited to, Fast Fourier Transform (FFT) analysis, spectrogram analysis, sliding window Fast Fourier Transform (FFT)/Discrete Fourier transform (DFT) analysis, and spectral energy density analysis.

The sound analysis device 204 included with the sound monitoring system 200 may be located at various devices and/or machines of the acoustic monitoring communications network 100. For example, the sound analysis device 204 may be located at the portable acoustic detection device 102, the cloud computing environment 110, the data server 108, the automobile 114, etc. Referring to the exemplary embodiment illustrated in FIG. 2, the sound analysis device 204 is located remotely from the portable acoustic detection device 202. For example, the sound analysis device 204 may be located at a data server 108.

The sound analysis device 204 includes a user interface 216 and a sound database 218. In addition, the sound analysis device 204 may be in electrical communication with a diagnosis module 220 and a confidence level module 222 for diagnosing a sound-producing device and determining corrective actions for inhibiting the sound, as described in greater detail below. In at least one exemplary embodiment illustrated in FIG. 2, the diagnosis module 220 and the confidence level module 222 may be included with the sound analysis device 204. However, it can be appreciated that the diagnosis module 220 and the confidence level module 222 may be included with the portable acoustic detection device 202.

The user interface 216 may include an input unit and a display unit. The input unit may receive inputs from a user and/or technician operating the sound analysis device 204. The display unit may display information regarding the sound information stored in the sound database 218. The display unit may also display information received from the portable acoustic detection device 202 to a user and/or technician operating the sound analysis device 204. For example, the sound analysis device 204 may receive identification information, such as a make/model number, image, etc., which identifies the sound-producing device producing the sound to be diagnosed. Accordingly, the display unit may display the identification information, thereby assisting a user and/or technician, in diagnosing the sound.

The sound database 218 is capable of storing predetermined sound information such as pre-recorded sound data, which may be classified, clustered and annotated. Moreover, a user and/or technician may use the user interface 216 to input additional sound information to the sound database 218.

As mentioned above, the diagnosis module 220 may determine at least one diagnosis of the sound-producing device based on the sound transmitted by the portable acoustic detection device 202. Based on the diagnosis, the diagnosis module 220 may determine additional information including, but not limited to, sound-producing device information, user control information, diagnosis information, an alert, and a corrective action. The information, such as the alerts, diagnosis information etc., may be received and displayed by the portable acoustic detection device 202 as described above. Further, the additional information may indicate proper operation of the sound-producing device.

Diagnoses performed by the diagnosis module 220 may be executed according to various well-known signal processing techniques. For example, the diagnosis module 220 may identify the sound produced by the sound-producing device by comparing sound data indicative of the sound to a predetermined acoustic wavelength of a pre-recorded sound stored in the sound database 218. Various signal processing techniques may be used to execute the sound comparison described above including, but not limited to, Fast Fourier Transform (FFT) analysis, spectrogram analysis, sliding window Fast Fourier Transform (FFT)/Discrete Fourier transform (DFT) analysis, and spectral energy density analysis. The diagnoses may be stored in a storage medium, such as sound data base 220, or at a remote location such as a data server or cloud computing environment 110 and/or, and recalled for future use.

In addition to diagnosing the sound generated by the sound-producing device, the diagnosis module 220 may determine corrective actions, which are transmitted to the portable acoustic detection device 202 and are displayable to a user. Accordingly, a user may perform the corrective actions on the sound-producing device to inhibit the sound. For example, the portable acoustic detection device 202 may display maintenance instructions and/or sound-producing device settings instructions. The maintenance instructions may provide a user with information for correcting improper operation of the sound-producing device, lists of repair people familiar with the improper operation, directions to particular repair shops, repair order forms, service organizations, replacement parts of the sound-producing device, new sound-producing device sales, etc. Further, although the sound-producing device may be operating correctly, i.e., the diagnosis module determines that the sound-producing device is not faulty or defective, the diagnosis module may output sound-producing device settings instructions that instruct a user to adjust one or more operating settings of the sound-producing device to inhibit the sound produced therefrom. For example, if the diagnosis module 220 determines that the sound detected by the portable acoustic detection 202 device is produced by a properly operating fan, the diagnosis module 220 may output a sound-producing device settings instruction that instructs a user to reduce the speed of the fan, thereby inhibiting the sound.

The sound analysis device 204 may further include a confidence level module 222 that electrically communicates with the diagnosis module 220. The confidence level module 222 may determine a confidence level of one or more diagnoses determined by the diagnosis module 220. The confidence level indicates a likelihood as to whether the diagnosis determined by the diagnosis module 220 is correct. For example, confidence levels may be assigned a value ranging from 0-5. A diagnosis having a high confidence level, e.g., a value of 5, indicates that the particular diagnosis determined by the diagnosis module is likely correct and no other alternative diagnoses associated with the sound exist. However, a low confidence level, e.g., a value of 0 indicates that the particular diagnosis determined by the diagnosis module is likely incorrect and more accurate diagnoses of the sound exist. Accordingly, as the confidence level, i.e., value, increases from 0 to 5, the likelihood that diagnosis module 220 determined the correct diagnosis increases.

The confidence level associated with a particular diagnosis may be determined in several ways. For example, if a majority of acoustic experts, e.g., five out of five acoustic experts have concluded via testing, or otherwise, that a particular sound is caused by a particular problem, then the confidence level associated with the particular diagnosis is assigned a high confidence level, e.g., a high value of 5 out of 5. However, if minority of experts, e.g., only two out of five experts have concluded a particular problem causes the particular sound, then the diagnosis is assigned a low confidence level, e.g., 2 out of 5. Accordingly, a user may be informed of the strength of diagnosis, i.e., the likelihood as to whether the diagnosis received is correct.

The confidence module 224 may also update a confidence level associated with a particular diagnosis in response to a result of the corrective action taken by the user upon the sound-producing device. Accordingly, the accuracy of the stored diagnoses may be increased. For example, if a corrective action corresponding to a particular diagnosis is determined to inhibit the sound, the confidence level module 222 may increase the level, i.e., value, associated with the particular diagnosis. Alternatively, if the corrective action corresponding to the particular diagnosis failed to inhibit the sound, the confidence level module 222 may decrease the level, i.e., value, of the confidence level associated with the particular diagnosis. When more than one diagnosis associated with a particular sound exists, the diagnosis module 220 may prioritize the diagnoses according to the confidence level. Accordingly, the diagnosis module 220 may output the diagnosis having the highest confidence level. In addition, the user may be presented with a plurality of diagnoses in order of their respective confidence level. For example, diagnoses may be displayed according to diagnoses that are most likely correct (i.e., diagnoses having high confidence levels) to diagnoses that are most likely incorrect (i.e., diagnoses having low confidence levels).

Further, the confidence level module 222 may perform a confidence-increasing action based on a comparison between the particular confidence level (C) and a predetermined threshold value (Th). More specifically, the confidence level module 222 may compare the particular confidence level (C) to the predetermined threshold value (Th), and initiate the confidence-increasing action when the particular confidence level (C) is less than the predetermined threshold value (Th), i.e., C<Th. In at least one exemplary embodiment, the confidence-increasing action may be automatically performed each time C<Th. Upon initiating the confidence-increasing action, the sound monitoring system 200 may interact with a technician and/or social media network via the data network 206 to receive updated diagnosis information and/or corrective actions.

Accordingly, an end-to-end acoustic monitoring system may be achieved, which allows a user to obtain a sound produced from a sound-producing device, receive a diagnosis, and attempt to inhibit the sound according to corrective actions displayed on the portable acoustic detection device.

Figure 3:
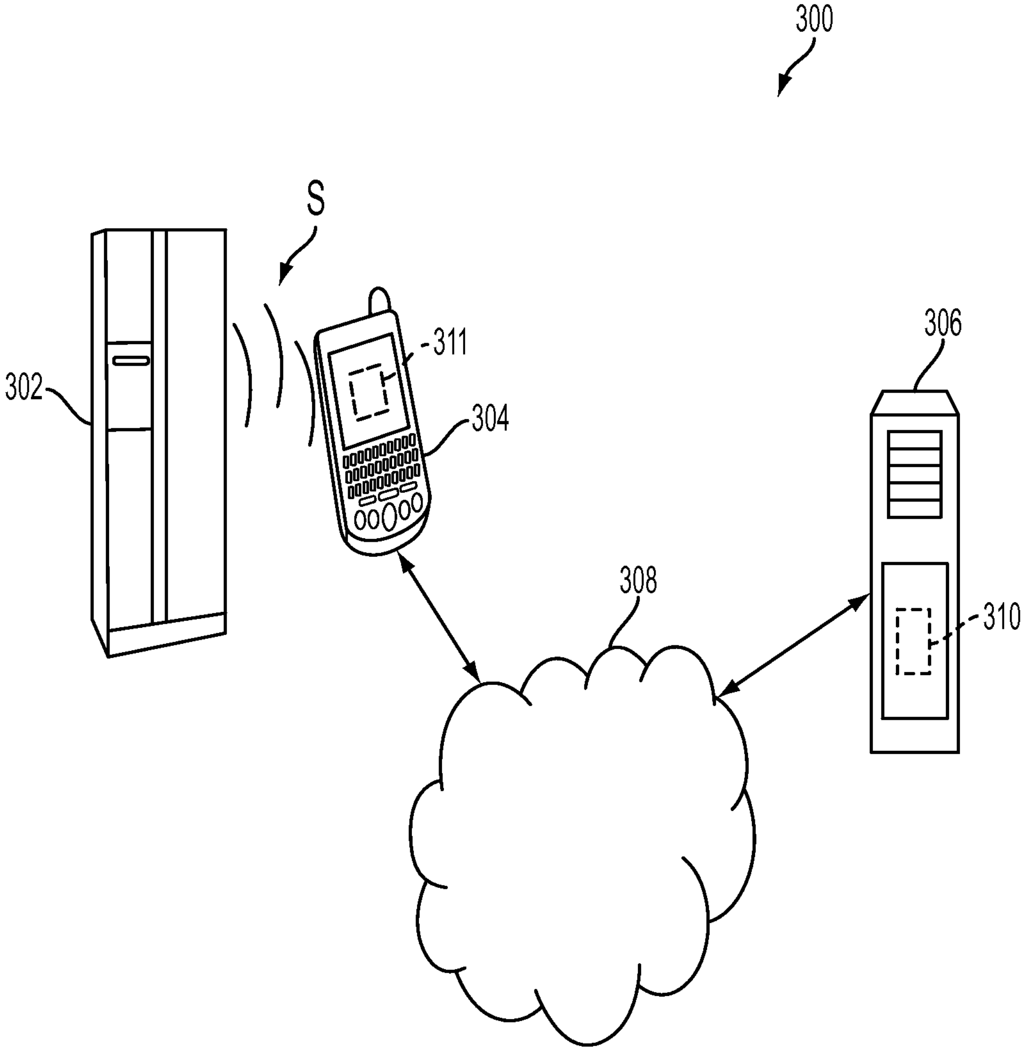
FIG. 3 illustrates an acoustic monitoring system according to another exemplary embodiment of the present teachings.

Referring now to FIG. 3, a sound monitoring system 300 is illustrated according to an exemplary embodiment of the present teachings. The sound monitoring system 300 includes a sound producing device, such as a consumer appliance 302, a portable acoustic detection device, such as a cellular telephone 304, and a data server 306. The cellular telephone 304 and the data server 306 may communicate with one another via a data network 308. Moreover, the data server 306 may include the sound analysis device 310 discussed in detail above.

The cellular telephone 304 receives sound (S) generated by the consumer appliance 302. More specifically, the cellular telephone 304 may include a sound application module 311 that stores a sound application, as described above. The user of the cellular telephone 304 may execute the sound application, which initiates communication with the sound analysis device 310 located at the data server 308. Upon execution of the sound application, the user may also input identification information, such as a make/model number, an image of the consumer applicant 302, etc., which is then transmitted to the sound analysis device 310. In response to receiving the identification information, the sound analysis device 310 may direct the user capture the sound generated by the consumer appliance 302. In at least one exemplary embodiment of the present teachings, the sound analysis device 310 may instruct the user to locate the cellular telephone 304 at different locations near the consumer appliance 302. Additionally, the sound analysis device 310 may direct the user as to the number of sound samples to capture. Upon capturing the sound, the cellular telephone 304 may convert the sound into sound data via the sound application module 311, and may transmit the sound data to the sound analysis device 310.

Upon receiving the sound data, the sound analysis device 310 may initiate a diagnosis procedure via the diagnosis module, as discussed above. Once a diagnosis is determined, the sound analysis device 310 may also determine a corrective action associated with the diagnosis for inhibiting the sound. As discussed above, if multiple diagnoses exist, the sound analysis device 310 may prioritize the diagnoses based on confidence levels determined via the confidence level module. After determining a particular diagnosis, the sound analysis device 310 may transmit the particular diagnosis and corrective action to the cellular telephone 304. Accordingly, the user may perform to the corrective action upon the consumer device 302 to inhibit the sound. In addition the user may input the result of the corrective action to the cellular telephone 304. As discussed above, if the corrective action successfully inhibits the sound, the sound analysis device 310 may increase confidence level associated with the particular diagnosis sent to the user and output a termination signal that terminates the diagnosis procedure executed by the sound application. Otherwise, the sound analysis device 310 may decrease the confidence level associated with the particular diagnosis sent to the user and the sound analysis device 310 may begin determining another diagnosis. Accordingly, the diagnosis may be continued until a proper diagnosis is determined.

Figure 4:
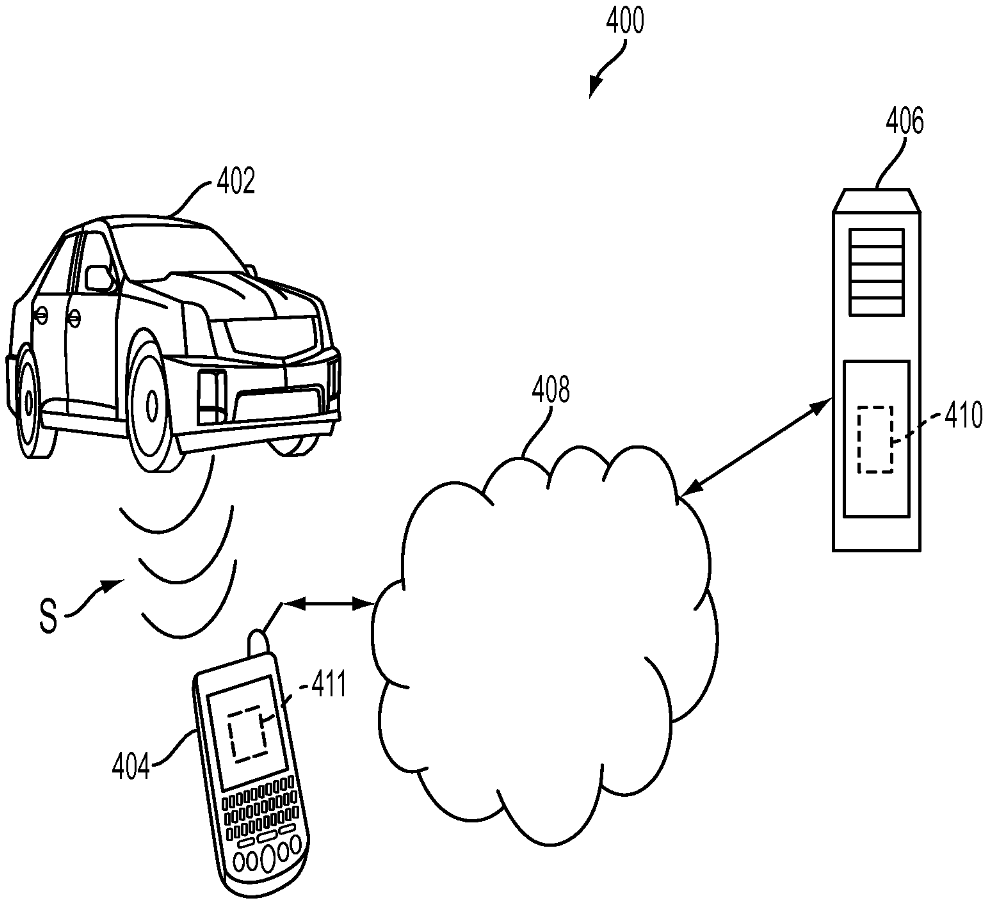
FIG. 4 illustrates an acoustic monitoring system according to yet another exemplary embodiment of the present teachings.

Referring now to FIG. 4, a sound monitoring system 400 is illustrated according to another exemplary embodiment of the present teachings. The sound monitoring system 400 includes a sound producing device, such as an automobile 402, a portable acoustic detection device, such as a cellular telephone 404, and a data server 406. The cellular telephone 404 and the data server 406 may communicate with one another via a data network 408. The sound monitoring system 400 operates similarly to the sound monitoring system 300 discussed above with respect to FIG. 3.

Referring to the exemplary embodiment illustrated in FIG. 4, a user of the cellular telephone 402 may become aware of an unfamiliar and/or undesired sound (S) produced by the automobile 404. Upon initializing a sound application program included with sound application module 411 of the cellular telephone 404, the user may input a make/model of the automobile 402 and a particular area of the automobile 402 generating the sound, for example the engine compartment. In response to the user's inputs, the sound analysis device 410 may instruct the user to locate the cellular telephone 404 near various engine components located in the engine compartment, such as such as the cylinder block, intake system, cooling system, etc. Accordingly, various engine components possibly contributing to the sound may be analyzed by the sound analysis device 410 such that the sound may be properly diagnosed.

Figure 5:
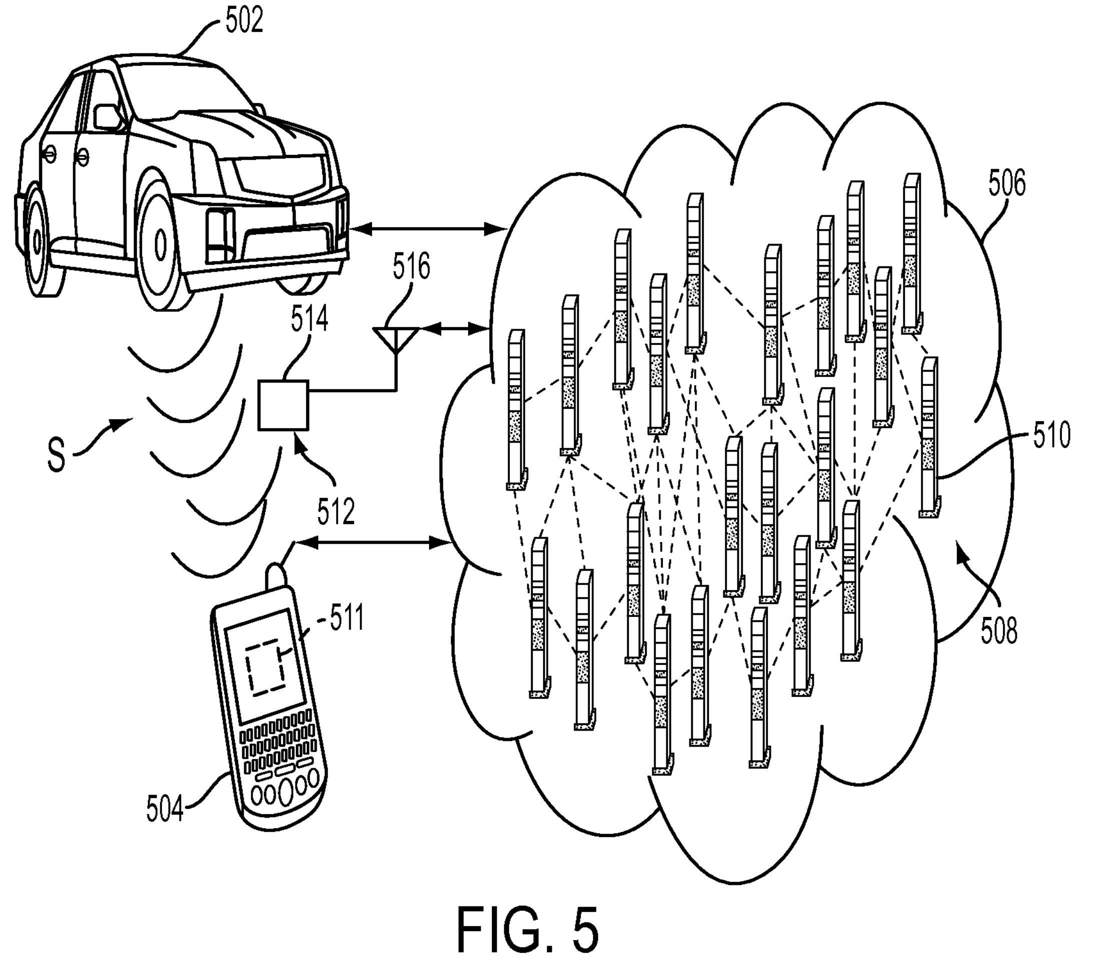
FIG. 5 illustrates an acoustic monitoring system according to still another exemplary embodiment of the present teachings.

Referring to now to FIG. 5, a sound monitoring system 500 is illustrated according to another exemplary embodiment of the present teachings. The sound monitoring system 500 operates similarly to the sound monitoring systems 300 and 400 described in detail above. The exemplary sound monitoring system 500 illustrated in FIG. 5 includes a sound producing device, such as an automobile 502, a portable acoustic detection device, such as a cellular telephone 504, and a cloud computing environment 506.

The cloud computing environment 506 may store pre-recorded sounds, diagnosis information and corrective actions via one or more computing nodes 508. In addition, a sound analysis device 510 including a diagnosis module and confidence module may be implemented via the computing nodes 508 of the cloud computing environment 506. The diagnosis and confidence level modules may operate similar to the diagnosis module 220 and the confidence level module 222, respectfully, as discussed above.

The automobile 502 and/or the cellular telephone 504 may each communicate with the cloud computing environment 506 to share sound information and/or other information including, but not limited to, diagnosis information, automobile maintenance information, corrective action information, etc. Accordingly, one or more sounds (S) produced by the automobile 502 and detected by the cellular telephone 504 may be processed by a sound application module 511 included in with the cellular telephone 504, analyzed by leveraging the sound analysis device 510 implemented at the cloud computing environment 506.

An exemplary embodiment of the sound monitoring system 500 illustrated in FIG. 5 may further include a sensor-transceiver combination device 512 generally indicated. The sensor-transceiver combination device 512 includes a sensor 514 and a transceiver 516. The sensor 514 detects information corresponding to the automobile 502. The sensor 516 may include, for example, a microphone that detects one or more sounds produced by the automobile 502. The transceiver 516 is in electrical communication with the sensor 514. In addition, the transceiver 516 may electrically communicate with any of the automobile 502, the cellular telephone 504, and the cloud computing environment 506. Accordingly, information between the sensor-transceiver combination device 512, automobile 502, cellular telephone 504, and cloud computing network 506 may be communicated between one another.

In at least one exemplary embodiment, the sensor-transceiver combination device 512 may be implemented in an automobile service station. Thus, sounds produced by an automobile 502 during servicing and/or maintenance may be analyzed. For example, the sensor-transceiver combination device 512 may be implemented at a refueling station. As the automobile 502 is prepared for refueling, a sensor 514 located at the refueling station may detect sound from the automobile 502, and the transceiver 516 may transmit the sound to the cloud computing environment 506. The sound may be analyzed by the sound analysis device 510 implemented via the cloud computing environment 506, and diagnosis information and/or corrective actions may be transmitted back to the refueling station and/or cellular telephone 504 for display to the driver of the automobile 502.

Now referring to the flow diagrams described below, various exemplary methods of monitoring a sound produced from a sound-producing device are described. There may be many variations to the diagrams or the operations described therein without departing from the spirit of the teachings. For instance, the operations described may be performed in a differing order or steps may be added, deleted or modified. All of these variations are considered a part of the claimed teachings.

Figure 6:
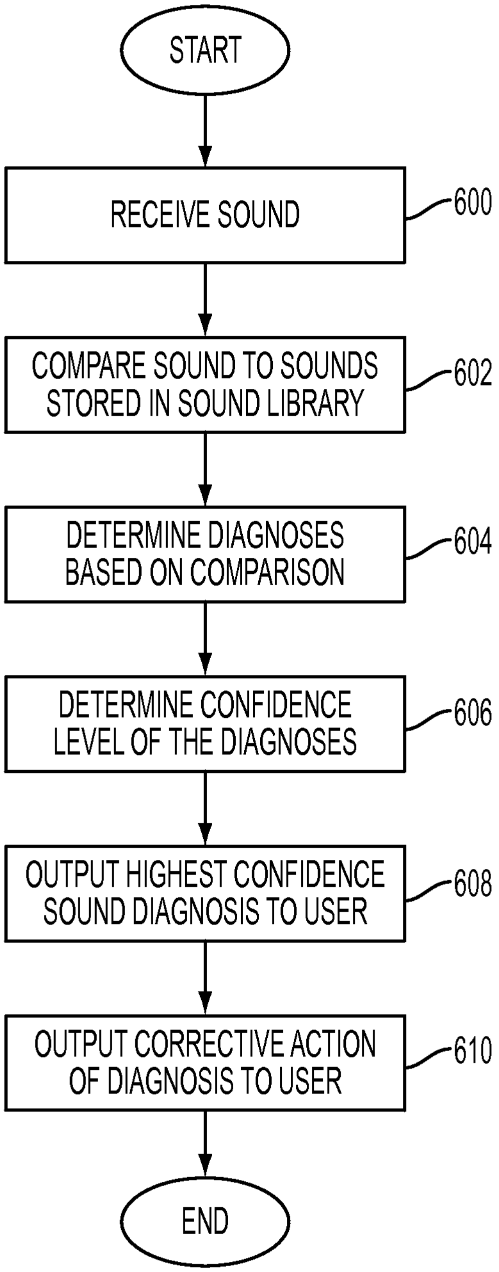
FIG. 6 is a flow diagram illustrating a method of monitoring acoustics of a sound-producing device according to an exemplary embodiment of the present teachings.

Referring now to FIG. 6, a flow diagram illustrates a method of monitoring acoustics of a sound-producing device according to an exemplary embodiment of the present teachings. At operation 600, a sound produced by a sound-producing device is detected. In at least one exemplary embodiment, the sound is captured by a portable acoustic detection device, such as a cellular telephone. The sound-producing device may be a consumer appliance, an electrical device, and automobile, etc. The sound and/or sound data indicative of the sound is compared to pre-recorded sounds at operation 602. The pre-recorded sounds are included in a sound data base, which may be stored at the portable acoustic detection device, and/or at a location remote from the portable acoustic detection device, such as a data server and/or a cloud computing environment. Based on the comparison between the sound and the pre-recorded sound, one or more diagnoses are determined at operation 604. At operation 606, a confidence level corresponding to the one or more diagnoses is determined, and a diagnosis having the highest confidence level is output at operation 608. At operation 610, a corrective action is output to the portable acoustic detection device such that a user may apply the corrective action to the sound-producing device for inhibiting the sound, and the method ends.

Figure 7:
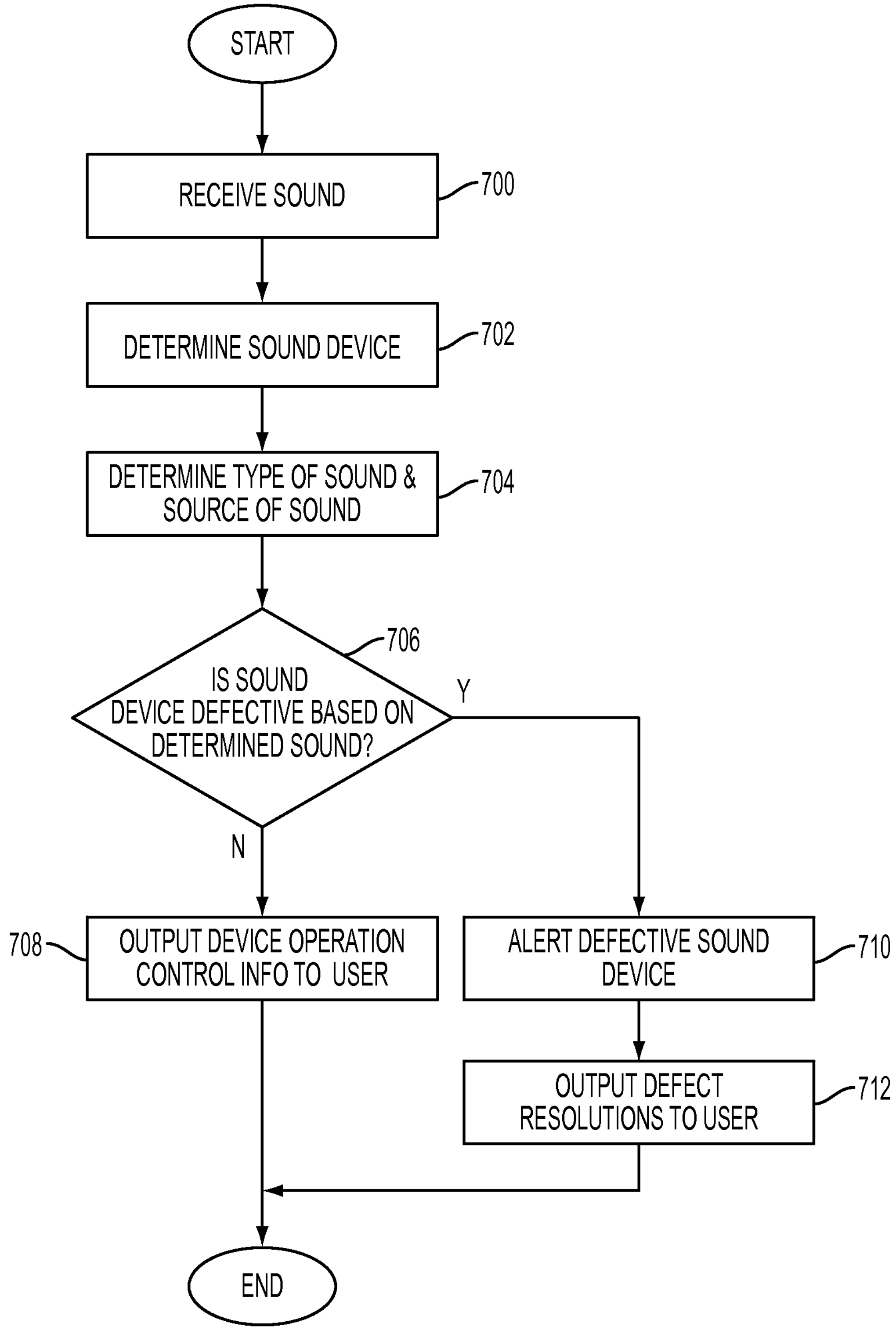
FIG. 7 is a flow diagram illustrating a method of monitoring acoustics of a sound-producing device according to another exemplary embodiment of the present teachings.

Referring now to FIG. 7, a flow diagram illustrates a method of monitoring acoustics of a sound-producing device according to another exemplary embodiment of the present teachings. At operation 700, a sound produced by a sound-producing device is captured via a portable acoustic detection device, such as a cellular phone. At operation 702, identification data identifying the sound-producing device is input to the portable acoustic detection device. The identification data may be input by a user of the portable acoustic detection device via a user interface. In addition, the sound-producing device may output identification information to the portable acoustic detection device. For example, the sound-producing device may transmit a model number to the portable acoustic detection device via Bluetooth wireless communication. In response to identifying the sound-producing device at operation 702, the method may determine the sound received at operation 700 and the origin of the sound at operation 704.

At operation 706, the sound-producing device may be determined as being defective. If the sound-producing device is determined to be operating normally, i.e., not defective, one or more control measures for reducing sound produced by the sound-producing device may be output at operation 708. For example, control measures such as reducing a motor speed, cycle-frequency, power consumption, etc., may be output to a user that such that a noise produced by the sound-producing device may be inhibited. Otherwise, if the sound producing device is determined to be defective at operation 706, an alert, such as a graphic, sound, etc., may be output at the portable acoustic device to alert the user the sound-producing device is defective. At operation 712, information for resolving the defective sound-producing device may be output, and the method ends. For example, information such as maintenance instructions, lists of repair technicians, directions to particular repair shops, repair order forms, service organizations, replacement parts of the sound-producing device, new sound-producing device sales, etc., may be output to the user to assist the user in fixing and/or replacing the sound-producing device, thereby eliminating the sound.

Figure 8:
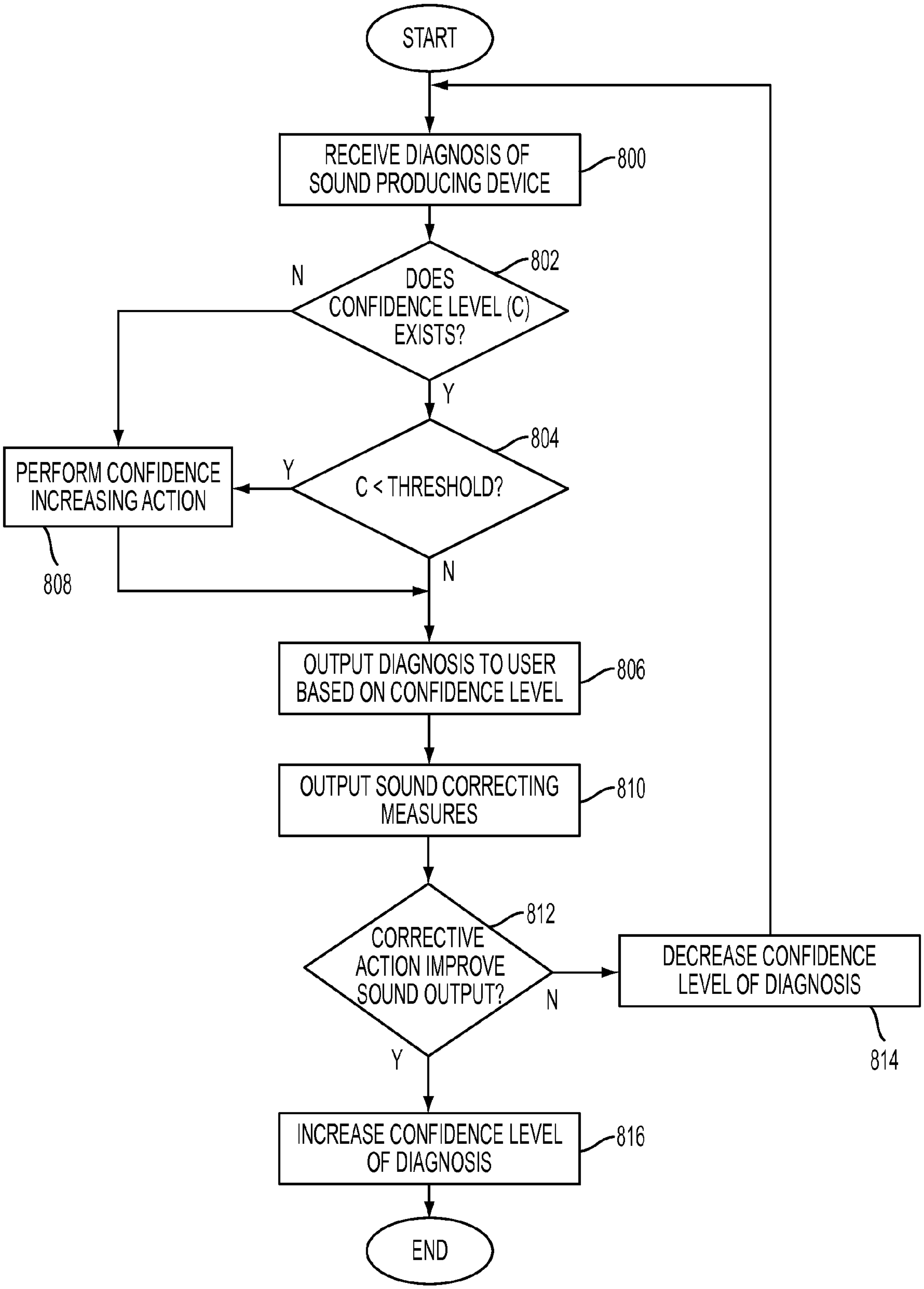
FIG. 8 is a flow diagram illustrating a method of updating a confidence level associated with a diagnosis provided by an acoustic monitoring system according to an exemplary embodiment of the present teachings.

Referring now to FIG. 8, a flow diagram illustrates a method of updating a confidence level associated with a diagnosis provided by an acoustic monitoring system according to an exemplary embodiment of the present teachings. At operation 800, a diagnosis corresponding sound produced by a sound-producing device is received. At least one exemplary embodiment of the present teachings performs the diagnosis by comparing the received sound to a pre-recorded sound. Upon diagnosing the sound, a determination is made as to whether a confidence level (C) corresponding to the diagnosis exists. If a confidence level exists, the confidence level is compared to a predetermined threshold value (Th) at operation 804. If $C \geq Th$, the diagnosis is output at operation 806. Further, the confidence level may be compared to other diagnoses at operation 806, and output according based on the confidence level. In at least one exemplary embodiment, the diagnoses may be prioritized based on the respective confidence level.

If it is determined at operation 802 that no confidence level is associated with the diagnosis, or if it is determined at operation 804 that $C < Th$, then a confidence increasing action is performed at operation 808, and the diagnosis is output at operation 806. At operation 808, corrective actions are output. The corrective actions may include maintenance instructions, device control measures such as reducing a motor speed, cycle-frequency, power consumption, etc. At operation 812, a determination is made as to whether the corrective action inhibited the sound produced by the sound-producing device. In at least one exemplary embodiment, a user may input a result of the corrective action via a user interface of the portable acoustic detection device. If the corrective action failed to inhibit the sound, the confidence level associated with the diagnosis is decreased at operation 814, and the method returns to operation 800 where a new diagnosis may be received. However, if the corrective action successfully inhibited the sound, the confidence level associated with the diagnosis is increased at operation 816, and the method ends. Accordingly, diagnoses associated with various sounds produced by one or more sound producing devices may be continuously updated based on a user's real-time experience, and a user may be provided with the most up-to-date diagnoses for diagnosing a particular sound.

As described in detail above, at least one exemplary embodiment of the present teachings allows a user to obtain a sound produced from one or more locations of a sound-producing device via a portable acoustic detection device, receive a diagnosis of the sound and corrective actions via the portable acoustic detection device, and to attempt to inhibit the sound according to corrective actions displayed on the portable acoustic detection device. Accordingly, a user may personally diagnosis a sound produced by a sound-performing device with convenience, and without directly seeking the assistance of a technician. As a result, convenience to the user is increased, while additional costs resulting from technician analysis may be avoided.

As will be appreciated by one skilled in the art, features of the present teachings may be embodied as a system, method or computer program product. Accordingly, features of the present teachings may take the form of an entirely hardware embodiment, an entirely software embodiment (including firmware, resident software, micro-code, etc.) or an embodiment combining software and hardware features that may all generally be referred to herein as a "circuit," "module" or "system." Furthermore, features of the present teachings may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for features of the present teachings may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Features of the present teachings are described above with reference to flowchart illustrations and/or block diagrams of methods, apparatus (systems) and computer program products according to embodiments of the teachings. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present teachings. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the teachings. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present teachings has been presented for purposes of illustration and description, but is not intended to be exhaustive or limited to the teachings in the form disclosed. Many modifications and variations will be apparent to those of ordinary skill in the art without departing from the scope and spirit of the teachings. The embodiment was chosen and described in order to best explain the principles of the teachings and the practical application, and to enable others of ordinary skill in the art to understand the teachings for various embodiments with various modifications as are suited to the particular use contemplated.

While the preferred embodiment to the teachings had been described, it will be understood that those skilled in the art, both now and in the future, may make various improvements and enhancements which fall within the scope of the claims which follow. These claims should be construed to maintain the proper protection for the teachings first described.

What is claimed is:

1. An acoustic monitoring system, comprising:

a portable acoustic detection device configured to receive sound from a sound-producing device;

a sound analysis device in electrical communication with the portable acoustic detection device via a data network, the sound analysis device configured to determine at least one diagnosis of the sound-producing device based on a comparison between the sound and pre-recorded sound data, and to determine at least one corrective action based on the at least one diagnosis; and a confidence level device in electrical communication with the portable acoustic detection device and the sound analysis device, the confidence level device configured to determine a confidence level of the at least one diagnosis indicating a likelihood that the at least one diagnosis is successfully diagnosed, wherein the confidence level device updates the confidence level of the at least one diagnosis in response to a result of the corrective action upon the sound-producing device.

2. The acoustic monitoring system of claim 1, wherein the confidence level module performs a confidence-increasing action that increases a particular confidence level of a respective diagnosis based on a comparison between the particular confidence level and a predetermined threshold value.

3. The acoustic monitoring system of claim 2, wherein the confidence-increasing action is performed automatically in response to the particular confidence level being less than the predetermined threshold value, wherein the confidence-increasing action includes communicating with at least one of a technician and a social media network via the data network to receive updated corrected actions.

4. The acoustic monitoring system of claim 3, wherein the diagnosis module outputs the at least one diagnosis to the portable acoustic detection device based on the confidence level.

5. The acoustic monitoring system of claim 1, wherein the portable acoustic detection device further comprises a user interface configured to receive at least one input from a user to identify the sound-producing device and to display at least one of the diagnosis and the corrective action output from the sound analysis device, wherein the diagnosis is based on the at least one input.

6. The acoustic diagnosis system of claim 1, wherein the portable acoustic detection device includes at least one of a portable terminal and a smartphone.

7. The acoustic monitoring system of claim 1, further comprising:

a sound database in electrical communication with the sound analysis device, the sound database configured to store the pre-recorded sound data, and to receive at least one of externally pre-recorded sounds and technician corrected actions.

8. A portable acoustic detection device, comprising:

a sensor configured to receive sound from a sound-producing device;

a wireless communication module configured to electrically communicate with a sound database that stores pre-stored sound data, and to transmit identification data that identifies the sound-producing device;

a sound application module configured to output locality information that indicates a least one location at which the portable acoustic detection device is positioned to receive the sound, and to output a diagnosis and corrective action information to inhibit the sound based on a comparison between the sound and the pre-stored sound data;

a user interface configured to display the diagnosis and corrective action information;

a confidence level module in electrical communication with the sound application module and the sound data, the confidence level module configured to determine a confidence level indicating a likelihood of success of the at least one diagnosis, the confidence level module configured to update the confidence level in response to a result of the corrective action taken upon the sound-producing device, and configured to perform a confidence-increasing action that increases a particular confidence level of a respective diagnosis based on a comparison between the particular confidence level and a predetermined threshold value.

9. The portable acoustic detection device of claim 8, wherein the confidence-increasing action is performed automatically in response to the particular confidence level being less than the predetermined threshold value.

10. The portable acoustic detection device of claim 9, wherein the confidence-increasing action includes communicating with at least one of a technician and a social media network via the data network to receive updated corrected actions, wherein the diagnosis module outputs the at least one diagnosis to the portable acoustic detection device based on the confidence level.

11. The portable acoustic detection device of claim 10, wherein the diagnosis module outputs a plurality of diagnoses that are prioritized based on respective confidence levels.

12. An acoustic analysis device, comprising:

a wireless communication module that electrically communicates with a portable acoustic detection device via a data network to receive sound data that is based on sound produced by a sound-producing device;

a sound database that stores pre-stored sound data, diagnosis data corresponding to the pre-stored sound data, and corrective action data corresponding to the diagnosis data;

a diagnosis module to determine at least one diagnosis of the sound-producing device based on a comparison between the sound data and the pre-recorded sound data, and to determine at least one corrective action based on the at least one diagnosis;

a confidence level module in electrical communication with the diagnosis module to determine a confidence level of the at least one diagnosis indicating a likelihood that the at least one diagnosis is successfully diagnosed, the confidence level module configured to update the confidence level in response to a result of the corrective action taken upon the sound-producing device.

13. The acoustic analysis device of claim 12, wherein the diagnosis module outputs the at least one diagnosis to the portable acoustic detection device based on the confidence level, and wherein the at least one diagnosis and a respective corrective action is output to the portable acoustic detection device for display.

14. The acoustic analysis device of claim 12, wherein the confidence level module increases the confidence level in response to the corrective action inhibiting the sound data and decreases the confidence level in response to the sound being unaffected by the corrective action.

* * * * *